(12) United States Patent
Metzger

(10) Patent No.: US 6,761,199 B1
(45) Date of Patent: Jul. 13, 2004

(54) SEAMING BOARD AND METHODS OF INSTALLING FLOOR COVERING

(76) Inventor: Bruce Edward Metzger, 2401 W. Paradise La., Phoenix, AZ (US) 85023

( * ) Notice: Subject to any disclaimer, the term of this patent is extended or adjusted under 35 U.S.C. 154(b) by 93 days.

(21) Appl. No.: 10/057,091

(22) Filed: Jan. 28, 2002

(51) Int. Cl.$^7$ .......................... B29C 65/00; B29C 65/02; B29C 65/40; B29C 65/50; B29C 65/56
(52) U.S. Cl. ................ 156/391; 156/304.4; 156/304.6; 156/304.7; 156/505; 156/545; 38/94
(58) Field of Search ............................... 156/505, 304.5, 156/304.6, 304.7, 391, 544, 545, 574, 304.4; D32/66; 38/17, 94, 103, 71, 75, 79, 80, 81

(56) References Cited

U.S. PATENT DOCUMENTS

| | | | | |
|---|---|---|---|---|
| 2,287,646 A | * | 6/1942 | Steele .......................... 108/99 |
| 2,854,148 A | * | 9/1958 | Mattos et al. .................. 108/28 |
| 3,660,191 A | * | 5/1972 | Shimota et al. .............. 156/152 |
| 4,584,040 A | * | 4/1986 | Anderson .................... 156/152 |
| 4,671,977 A | * | 6/1987 | Berry ........................... 428/62 |
| 4,726,867 A | * | 2/1988 | Gustavsen ............... 156/304.4 |
| 5,016,367 A | * | 5/1991 | Breen et al. ................... 38/135 |

* cited by examiner

Primary Examiner—Sue A. Purvis
(74) Attorney, Agent, or Firm—Parsons & Goltry; Michael W. Goltry; Robert A. Parsons

(57) ABSTRACT

Disclosed is a seaming board including opposing ends, opposing upper and lower major surfaces and attached abutment structure. The abutment structure is attached to the seaming board proximate one of the ends, and is adjustable between a closed condition overlying the upper surface and an open condition away from the upper surface.

8 Claims, 3 Drawing Sheets

US 6,761,199 B1

SEAMING BOARD AND METHODS OF INSTALLING FLOOR COVERING

FIELD OF THE INVENTION

This invention relates to floor covering installation equipment and to methods of installing floor covering.

BACKGROUND OF THE INVENTION

Installing carpet is a laborious task and the art is replete with tools specifically designed to facilitate and hasten carpet installation. Of the various tools available for carpet installation is the seaming board, which is a long flat board that is placed on the carpet padding between edges of adjacent carpet sections. Seam tape is disposed on the board, which is heated with an iron. After the seam tape is sufficiently activated in which the adhesive of the seam tape is melted, the iron is removed and portions of the opposing edges are pressed onto the activated portion of the seam tape, joining the portions of the opposing edges of the carpet sections together. A weight is usually applied in order to permit the melted adhesive to impregnate the underlayment of the carpet and to increase adhesion. This process is repeated until the edges of the carpet sections are joined together, in which a seam is produced. The seaming board prevents the adhesive from impregnating the carpet padding and prevents the carpet padding from becoming burned and damaged from the iron during this installation process, and provides a working area for safely activating the seam tape.

Using a seaming board, while important, is cumbersome. After a portion of the seam tape is activated, the seaming board must be advanced in order to activate the additional portions of the seam tape. Advancing the seaming board is usually done by hand, in which the seaming board is taken up by hand and advanced. This is inefficient, cumbersome, frustrating and time consuming, adding valuable time to the carpet installation process. Sometimes, a rope is tied to one end of the seaming board, in which one worker pulls on the seaming board with the rope advancing it while another worker mans the iron activating the seam tape and joining the edges of the opposing carpet sections together. This method is inefficient, as it requires two workers.

Given these and many other deficiencies in the art of seaming boards, there is a need for a new and improved seaming board that is easy to make, easy to use, inexpensive, highly efficient and that incorporates useful features for hastening and improving the efficiency of the joining the edges of opposing carpet sections in a carpet installation procedure.

SUMMARY OF THE INVENTION

The above problems and others are at least partially solved and the above purposes and others realized in a new and improved seaming board that includes opposing ends, opposing upper and lower major surfaces and attached abutment structure. The abutment structure is attached to the seaming board proximate one of the opposing ends, and is adjustable between a closed condition opposing the upper surface and an open condition away from the upper surface. In its closed condition, the abutment structure is capable of receiving a forcible impulse thereagainst by an implement, such as an iron, advancing along the upper surface of the seaming board. The abutment structure consists of opposing pivoted elements, which are adjustable between the closed condition opposing the upper surface and the open condition splayed away from the upper surface. An engagement of the opposing pivoted elements occurs in the closed condition of the abutment structure. The pivoted elements are attached at either side of the seaming board. Preferably, one of the opposing pivoted elements is fashioned with a receptacle, which receives the other of the opposing pivoted elements in the closed condition of the abutment structure, securing the pivoted elements in the closed condition.

Another embodiment of the invention is a seaming board that includes opposing ends, opposing sides, opposing upper and lower major surfaces and attached abutment structure. The abutment structure is attached at the opposing sides of the seaming board proximate one of the opposing ends, and is adjustable between a closed condition opposing the upper surface and an open condition away from the upper surface and the opposing sides of the seaming board. In its closed condition, the abutment structure is capable of receiving a forcible impulse by an implement, such as an iron, advancing along the upper surface of the seaming board. The abutment structure consists of a first element pivoted to one of the opposing sides of the seaming board and an opposing second element pivoted to the other of the opposing sides of the seaming board. The first and second elements are capable of being pivoted between the closed condition opposing the upper surface and the open condition splayed away from the upper surface. An engagement occurs between the first and second elements in the closed condition of the abutment structure. Preferably, one of the first and second elements is fashioned with a receptacle, which receives the other of the first and second elements in the closed condition of the abutment structure, securing the pivoted elements in the closed condition.

Yet another embodiment of the invention consists of a seaming board including opposing ends and opposing upper and lower major surfaces, an attached iron and attached abutment structure. In this embodiment, the iron includes a force applying end and is disposed against the upper surface, usually applied directly to seam tape disposed on the upper surface of the seaming boarding in a carpet installation process. The abutment structure is attached to the seaming board proximate one of the opposing ends and is adjustable between a closed condition engaging the force applying end of the iron and an open condition away from the force applying end of the iron. The abutment structure consists of a first element pivoted to one of the opposing sides of the seaming board and an opposing second element pivoted to the other of the opposing sides of the seaming board. The first and second elements are capable of being pivoted between the closed condition opposing the upper surface engaging the force applying end of the iron and the open condition splayed away from the upper surface. An engagement occurs between the first and second elements in the closed condition of the abutment structure. Preferably, one of the first and second elements is fashioned with a receptacle, which receives the other of the first and second elements in the closed condition of the abutment structure, securing the pivoted elements in the closed condition.

Consistent with the foregoing, the invention also contemplates associated methods.

BRIEF DESCRIPTION OF THE DRAWINGS

Referring to the drawings.

DETAILED DESCRIPTION OF A PREFERRED EMBODIMENT

Figure 1:
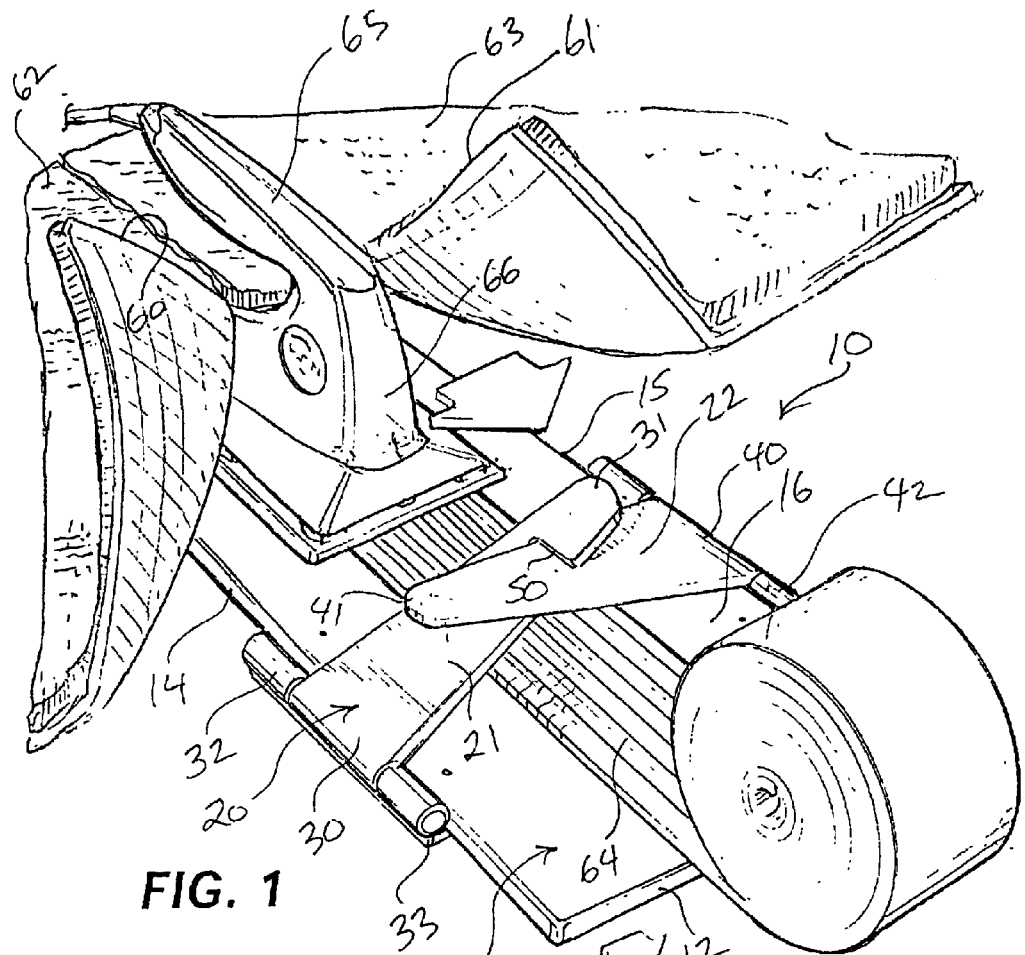
FIG. 1 is a perspective view of a seaming board incorporating abutment structure, in accordance with the principle of the invention, the seaming board shown as it would appear in use in a carpet installation procedure.
Figure 2:
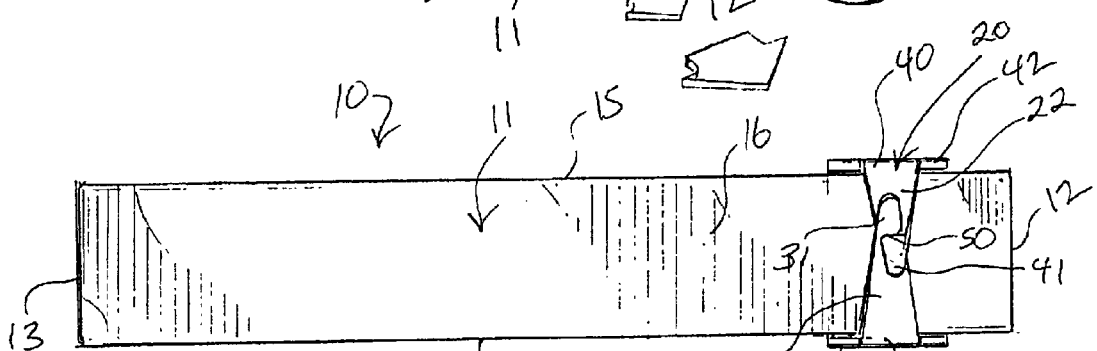
FIG. 2 is a top plan of the seaming board of FIG. 1.
Figure 3:
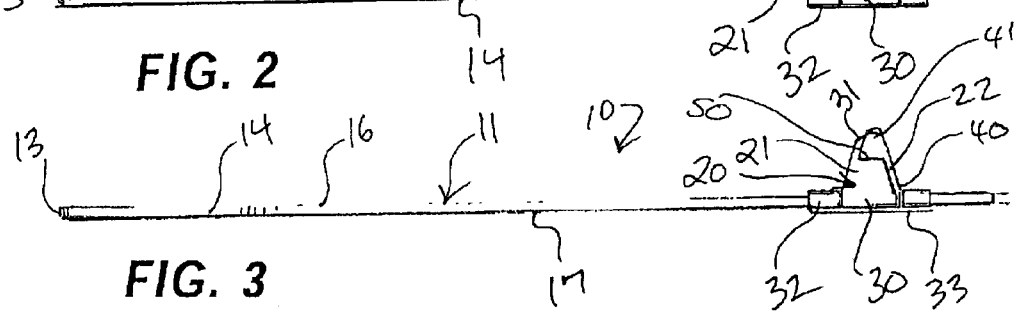
FIG. 3 is a side elevation of the seaming board of FIG. 1.
Figure 4:
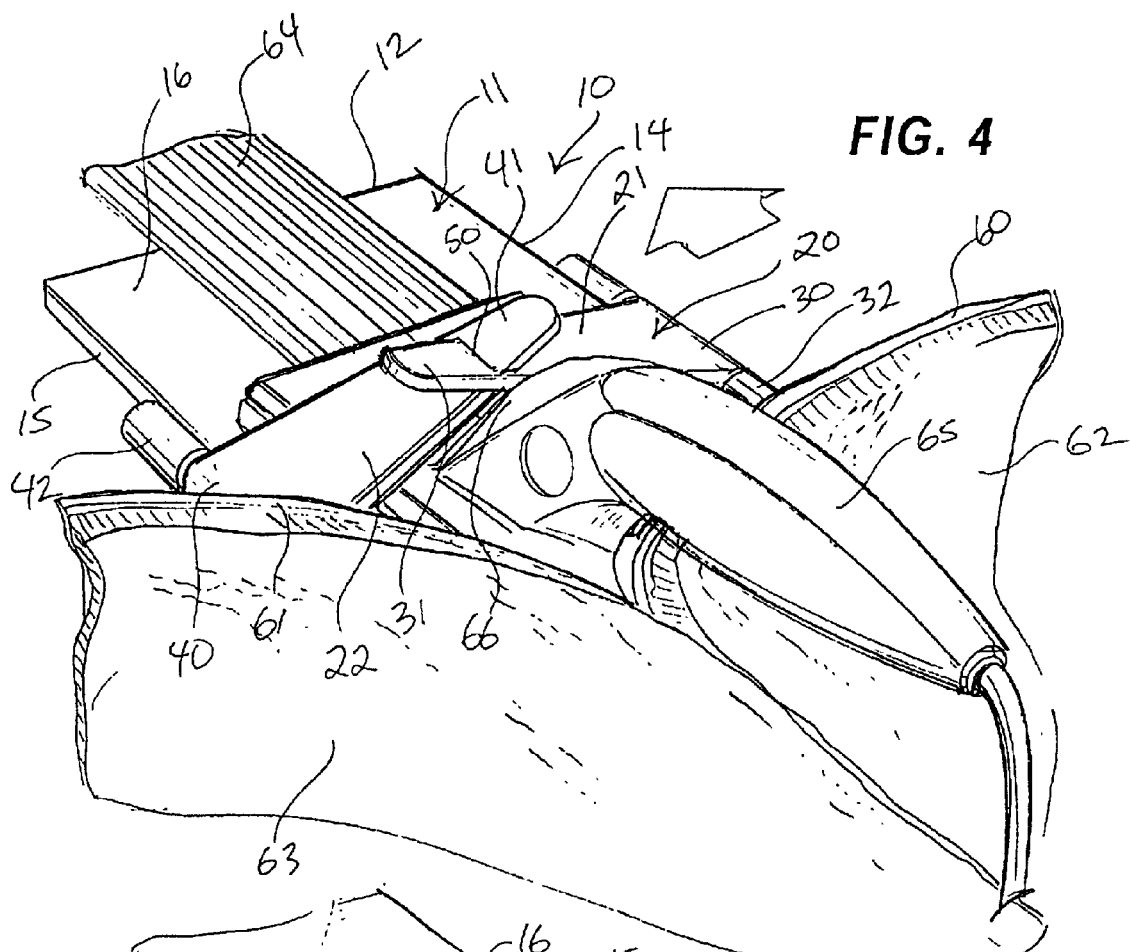
FIG. 4 is perspective view of the seaming board of FIG. 1 shown as it would appear in use in a carpet installation procedure.

Turning now to the drawings, in which like reference characters indicate corresponding elements throughout the several views, attention is first directed to FIG. 1 in which is seen a seaming board, embodying the principle of the instant invention, generally indicated by the reference character 10 and shown as it would appear in use in a carpet installation procedure. Looking momentarily to FIG. 2, seaming board 10 is an elongate, rectangular generally flat panel 11 having opposing ends 12,13, opposing sides 14,15, opposing upper and lower major surfaces 16,17 (lower surface 17 is denoted only in FIG. 3) and attached abutment structure 20 disposed proximate end 12. Like most seaming boards, in size panel 11 is preferably approximately 8 inches wide and 30 inches long. However, panel 11 can be 6 inches wide and 30 inches long, 4 inches wide and 48 inches long, 6 inches wide and 48 inches long, etc. Those having regard for the art will appreciate that panel 11 can be of any suitable width and length depending on specific needs and specific carpet installation requirements. Panel 11 is constructed of any suitable material commonly found in conventional seaming boards, such as thin plywood or paneling, aluminum, aluminum coated material, etc. Opposing minor edges characterize ends 12,13 and opposing major edges characterize sides 14,15. End 12 is a leading end of seaming board 10 and end 13 is a trailing end of seaming board 10.

Figure 5:
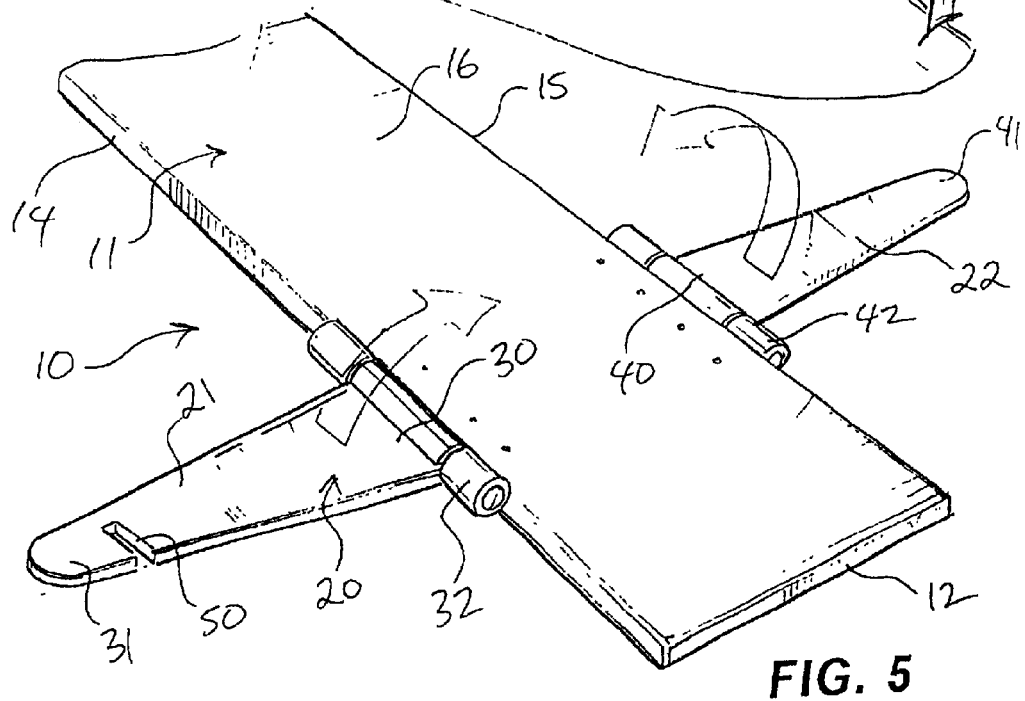
FIG. 5 is a fragmented perspective view of the seaming board of FIG. 1.

In the present embodiment, abutment structure 20 is attached to panel 11 proximate end 12, which is the leading end of seaming board 10 as previously explained, and is adjustable between a closed condition (FIGS. 1–4) opposing upper surface 16 and an open condition (FIGS. 5 and 6) away from upper surface 16. In its closed condition, abutment structure 20 is capable of receiving a forcible impulse thereagainst by an implement, such as an iron, advancing along upper surface 16 of seaming board 10 between end 13 and abutment structure 20 in a direction toward end 12 in a carpet installation procedure, and this will be more fully explained later in this specification.

In this specific embodiment, abutment structure 20 consists of opposing pivoted elements 21,22, which are capable of being pivoted between the closed condition (FIGS. 1–4) opposing upper surface 16 proximate end 12 and the open condition (FIGS. 5 and 6) splayed away from upper surface 16 projecting outwardly from sides 14,15, respectively. Elements 21,22 are substantially equally sized and shaped and fashioned of plastic, metal or other substantially rigid material or combination of materials. Elements 21,22 are each integrally fashioned, but each can be assembled from two or more parts if desired. Element 21 is elongate and generally flat including a proximal end 30 pivoted at side 14 and an opposing distal end 31. Proximal end 30 is attached to a hinge 32, which permits it to pivot. Hinge 32 is conventional in structure, is disposed immediately outboard of side 14 and is fastened to a plate 33 (FIG. 1), which overlies a portion of lower surface 17 and is secured thereto with screws, adhesive, rivets, or other suitable fastening mechanism. Hinge 32 can be attached in other ways in accordance with the ordinary skill attributed to artisans devoted to the art. Similar to element 21, element 22 is elongate and generally flat including a proximal end 40 pivoted at side 15 and an opposing distal end 41. Proximal end 40 is attached to a hinge 42, which permits it to pivot. Hinge 42 is conventional in structure, is disposed immediately outboard of side 15 and is fastened to a plate (not shown), which overlies a portion of lower surface 17 and is secured thereto with screws, adhesive, rivets, or other suitable fastening mechanism. Hinges 42 can be attached in other ways in accordance with the ordinary skill attributed to artisans devoted to the art.

An engagement of elements 21,22 occurs in the closed condition of abutment structure 20, securing or otherwise maintaining elements 21,22 in the closed condition. Preferably, and with regard to FIG. 1, element 21 carries a receptacle 50 (see also FIG. 5), which is disposed proximate distal end 30 and essentially a narrow slot that extends into an edge of element 21. In the closed condition of elements 21,22, an edge of element 22 is disposed into receptacle 50 and this is done by manual manipulation, disposing and securing elements 21,22 in the closed condition. The closed condition of elements 21,22 is characterized by a triangular disposition of elements 21,22 disposed adjacent and extending away from upper surface 16 and this is readily appreciated in FIGS. 1 and 4. Although receptacle 50 faces end 12, it can be disposed to face end 13. Receptacle 50 can be positioned elsewhere along element 21 as desired so that it capable of securing element 22 in the closed condition so as to produce the triangular disposition of elements 21,22. Receptacle 50 can also be carried by element 22 if desired, rather than element 21. In other words, the nature of the engagement between elements 21,22 can be reversed.

Looking back to FIG. 1, seaming board 10 is useful for installing carpet and, more particularly, for joining edges 60,61 of adjacent carpet sections 62,63 in a carpet installation procedure. In use, seaming board 10 is placed on the carpet padding between edges 60,61 of carpet sections 62,63. Lower surface 17 of panel 11 is disposed against the carpet padding and conventional seam tape 64 is positioned upon upper surface 16, extending longitudinally along upper surface 16 generally from end 13 to end 12 and forwardly of end 12 as illustrated. Abutment structure 20 is disposed in its closed condition and seam tape 64 passes beneath it upon upper surface 16. A seam iron 65, which can be any conventional seam iron well known in the art, is disposed against upper surface 16 and, more particularly, against seam tape 64 rearward of abutment structure 20, i.e., toward end 13. With seam iron 65 disposed in an energized condition generating heat, seam iron 65 is maintained against a portion of seam tape 64 for a time period that is sufficient to activate seam tape 64, i.e., to dispose the adhesive of seam tape 64 in a softened or melted condition. After the portion of seam tape 64 is activated, seam iron 65 is advanced by hand toward abutment structure 20 for the purpose of activating another portion of seam tape 64. While another portion of seam tape 64 is being activated by seam iron 65, edges 60,61 of carpet sections 62,63 are disposed against one another and pressed against the activated portion of seam tape 64, adhesively joining together those portions of edges 60,61 of carpet sections 62,63 producing a joined seam portion. A weight is usually applied in order to permit the melted adhesive to impregnate the underlayment of the carpet and to facilitate adhesion. After suitable adhesion takes place, which usually occurs within only a few minutes, the weight is removed. Seaming board 10 prevents the adhesive of seam tape 64 from impregnating the carpet padding and prevents the carpet padding from becoming burned and damaged from the iron during this installation process, and provides a working area for safely activating seam tape 64.

This process is repeated until the full length of edges 60,61 of carpet sections 62,63 are joined together, in which a seam is produced attaching carpet sections 62,63. It is important to understand, in accordance with the principle of the invention, that seam iron 65 includes a force applying end 66 that faces and opposes abutment structure 20 in its closed condition and this is readily appreciated in FIG. 1. As seam iron 65 is advanced by hand by a devoted worker, force applying end 66 will eventually contact or engage elements 21,22 of abutment structure 20 (FIG. 4), facilitating an application of a forcible impulse thereagainst to cause advancement of seaming board 10 relative to carpet sections 62,63 and seam tape 64. And so by applying a forcible impulse against elements 21,22 of abutment structure 20 with force applying end 66 of seam iron 65, seaming board 10 is advanced forwardly as the process of activating seam tape 64 and joining edges 60,61 together is repeated in the process of joining edges 60,61 together.

Figure 6:
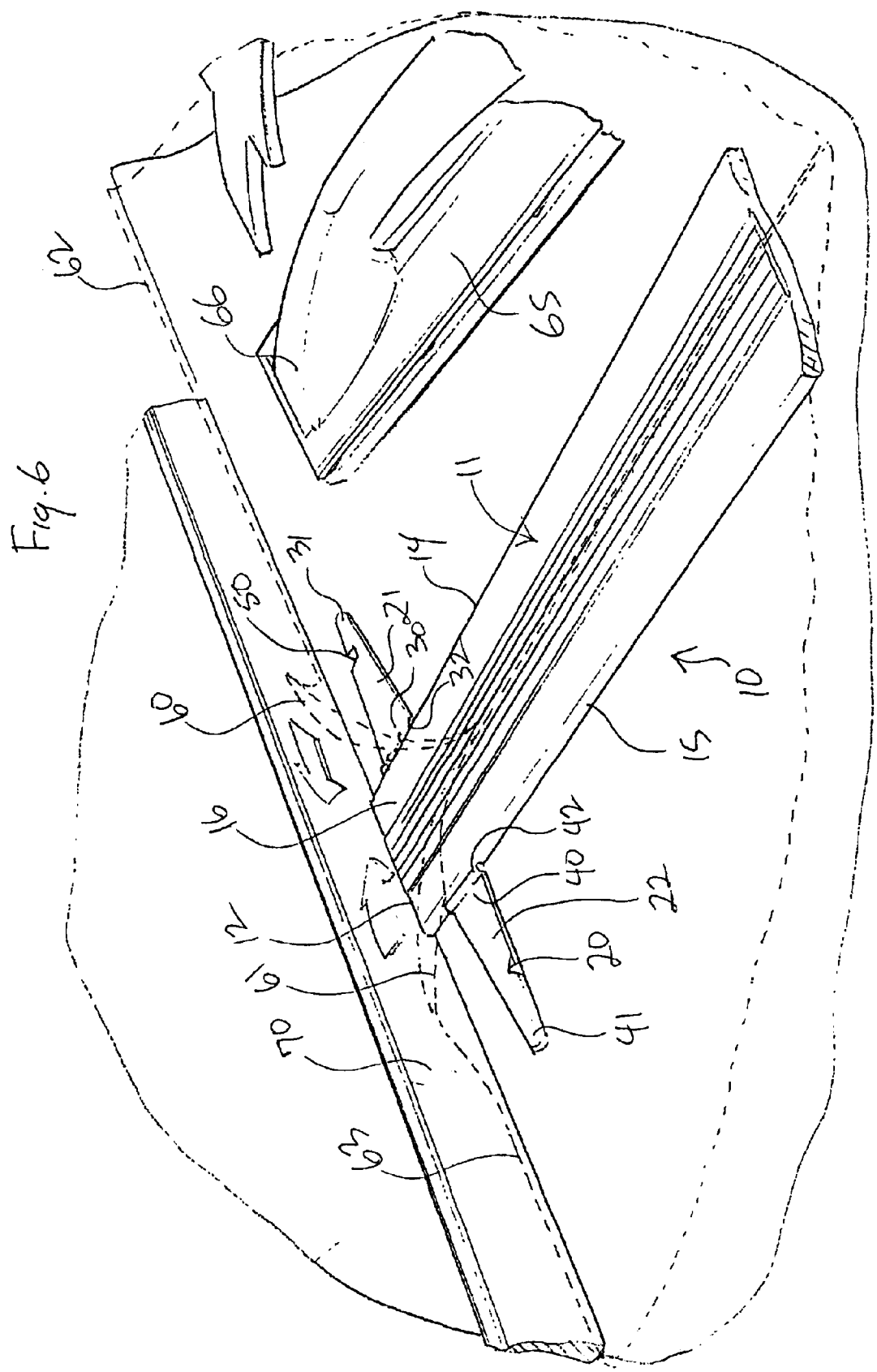
FIG. 6 is a perspective view of the seaming board of FIG. 1 shown as it would appear in use in a carpet installation procedure.

As seaming board 10 is so advanced in the course of a carpet installation procedure as described, end 12 may be caused to be moved against a marginal straight edge, namely, a wall 70 as denoted in FIG. 6. At this point, abutment structure 20 is capable of being moved into its open position by taking up elements 21,22, disengaging them and pivoting then away from upper surface 16 out of engagement with force applying end 66 of seam iron 65 so as to be splayed outwardly projecting away from sides 14,15, respectively, so as to underlie carpet sections 62,63, which are shown in phantom outline. This is readily depicted in FIG. 6. This orientation of seaming board 10 permits the advancement of seam iron 65 along upper surface 16 of seaming board 10 up to end 12 disposed against or otherwise adjacent wall 70 without impediment, permitting that portion of seam tape 64 there occupying to be activated for joining the terminal portions of edges 60,61 of carpet sections 62,63 disposed toward wall 70 without having to first remove seaming board 10 or struggle with it. After the terminal portions of edges 60,61 sealed together, the carpet can be peeled back and seaming board 10 removed for reuse. The structural combination of seaming board 10 including abutment structure 20, and seam iron 65, wherein abutment structure 20 is movable from its closed condition engaging force applying end 66 of seam iron 65 to its open position disengaged from force applying end 66 of seam iron 65 as herein described, is considered an embodiment of the invention in accordance with the principles and advantages attributed thereto in this specification.

Another beneficial feature of the invention is that elements 21,22 can, rather than be engaged in the closed condition as herein described, be disposed directly against upper surface 16 of panel 11 one atop the other, i.e., in an overlapping condition. Laying flat against upper surface 16 in this way allows seaming board 11 to be easily and conveniently stored during periods of nonuse, taking up very little space. The disposition of the pivoted attachment of elements 21,22 permits elements 21,22 to be disposed directly against upper surface 16 in an overlapping state.

The present invention is described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:

a seaming board including opposing ends, opposing sides and opposing upper and lower major surfaces;

abutment structure attached at the opposing sides of the seaming board proximate one of the opposing ends and adjustable between a closed condition opposing the upper surface and an open condition away from the opposing sides of the seaming board;

the abutment structure comprising:

a first element pivoted to one of the opposing sides of the seaming board, and an opposing second element pivoted to the other of the opposing sides of the seaming board, the first and second elements capable of being pivoted between the closed condition opposing the upper surface and the open condition splayed away from the upper surface; and the closed condition further comprising an engagement of the first and second elements opposing the upper surface.

2. Apparatus of claim 1, the abutment structure including an extremity capable of receiving in the closed condition of the abutment structure a forcible impulse by an implement advancing along the upper surface of the seaming board toward the one of the opposing ends between the opposing sides.

3. Apparatus of claim 1, further comprising a receptacle of one of the first and second elements receiving and securing an edge of the other of the first and second elements in the closed condition.

4. Apparatus comprising:

a seaming board including opposing ends and opposing upper and lower major surfaces;

an iron disposed against the upper surface and having a force applying end;

abutment structure attached to the seaming board proximate one of the opposing ends and adjustable between a closed condition engaging the force applying end and an open condition away from the force applying end;

the abutment structure comprising:

a first element pivoted to one of opposing sides of the seaming board, and an opposing second element pivoted to the other of the opposing sides of the seaming board, the first and second elements capable of being pivoted between the closed condition and the open condition; and the closed condition further comprising an engagement of the first and second elements.

5. Apparatus of claim 4, further comprising a receptacle of one of the first and second elements receiving and securing an edge of the other of the first and second elements in the closed condition.

6. In a seaming board including opposing ends, opposing sides and opposing upper and lower major surfaces, apparatus comprising abutment structure attached at the opposing sides of the seaming board proximate one of the opposing ends and adjustable between a closed condition opposing the upper surface and an open condition away from the opposing sides of the seaming board, wherein:

the abutment structure comprises:
- a first element pivoted to one of the opposing sides of the seaming board, and
- an opposing second element pivoted to the other of the opposing sides of the seaming board,
- the first and second elements capable of being pivoted between the closed condition opposing the upper surface and the open condition splayed away from the upper surface; and
- the closed condition further comprises an engagement of the first and second elements opposing the upper surface.

7. Apparatus of claim 6, the abutment structure including an extremity capable of receiving in the closed condition of the abutment structure a forcible impulse by an implement advancing along the upper surface of the seaming board toward the one of the opposing ends between the opposing sides.

8. Apparatus of claim 6, further comprising a receptacle of one of the first and second elements receiving and securing an edge of the other of the first and second elements in the closed condition.

* * * * *